United States Patent [19]

Jan Vader

[11] 4,061,957
[45] Dec. 6, 1977

[54] ELECTRIC ENERGY CONVERSION APPARATUS

[76] Inventor: Reinout Jan Vader, Verl. Frederikstraat 19, Groningen, Netherlands

[21] Appl. No.: 655,083

[22] Filed: Feb. 4, 1976

[51] Int. Cl.² ............................................ H02M 3/335
[52] U.S. Cl. ........................................ 363/22; 363/24; 363/71
[58] Field of Search ........................ 321/2, 27 R, 45 R; 331/113 A

[56] References Cited

U.S. PATENT DOCUMENTS

| 2,990,517 | 6/1961 | Grieg | 321/45 R X |
| 3,539,905 | 11/1970 | Schwarz | 321/2 X |
| 3,569,816 | 4/1969 | Marzolf | 321/2 |

OTHER PUBLICATIONS

IRE Transactions–Circuit Theory, "An Unsymmetrical Square-Wave Power Oscillator", D.A. Paynter, Mar. 1956, pp. 64, 65.
IBM Technical Disclosure Bulletin, "Digital Controller for High–Frequency Power Supply", R. Calvo & W. S. Duspiva vol. 18, No. 11, Apr. 1976.

*Primary Examiner*—William M. Shoop

[57] ABSTRACT

An electric energy conversion apparatus comprising a.d.c. - a.c. conversion unit with a first solid state controllable power switch arrangement and a second solid state controllable auxiliary switch arrangement. Said first and second switch arrangements have their respective outputs connected to the respective ends of a primary winding of a transformer for providing at its secondary winding an a.c. voltage derived by the recurrent on-off switching action of said first power switch arrangement from an input d.c. The switching action performed by said first power switch arrangement is controlled by a control circuit arrangement in such a manner that said first switch arrangement is always switched into its non-conductive state prior to saturation of the core material of said transformer, and is switched into its conductive state directly following the switching action causing said second switch arrangement to become non-conductive. With said d.c.-a.c. convesion unit various alternative embodiments of an electric-energy converter can be assembled. For instance two of said units can be operated in a parallel configuration with a common control circuit arrangement. By inclusion of a rectifying circuit arrangement or a cyclo-converter in the circuitry of said secondary transformer writting d.c.-a.c.-d.c. or d.c.-a.c₁-a.c₂ converters can be made at option.

41 Claims, 10 Drawing Figures

ELECTRIC ENERGY CONVERSION APPARATUS

This invention relates to apparatus for converting electrical energy.

A prior apparatus of the kind to which the present invention relates is described in Dutch patent specification No. 109295, and comprises a transformer having a core on which are wound a plurality of input windings and an output winding; a first high-power transistor configuration connected to one end of a tapped main input winding, and a second low-power transistor configuration connected to the other end of said main input winding, the arrangement being such that when a voltage is supplied to the converter said first and second transistors are alternately switched into the conducting state, and the core is magnetized in alternating directions, there being a rectifying circuit connected to said output winding, which rectifying circuit is in the current-conducting state only if said first high-power transistor configuration is in the conducting state.

The above prior converter is of simple design and is in essence just intended for converting a D.C. voltage into a different D.C. voltage. According to these prior proposals, the required oscillating action is obtained as a result of the fact that the core of the output transformer is repeatedly brought into saturation. This has the drawback that currents flowing in intervals through the main current path of the transistor configurations functioning as switching elements contain maximums each time just when the core becomes saturated, which results in considerable switching losses. It is in particular when the energy is converted at relatively high switching frequencies, for example, in the order of 20 KHz that the influence of these switching losses will become greater.

A further drawback of such a prior apparatus is that when a smoothing capacitor is provided across the output, this capacitor will be discharged partly across the load when the low-power transistor configuration is in the conducting state. The result is that each time when switching is effected whereby the high-power transistor configuration becomes conductive, this transistor configuration is additionally loaded.

Since, in addition, the input current of such a prior arrangement is high when the high-power transistor configuration is in the conducting state, whereas it is relatively low when the low-power transistor configuration is conductive, the input current has a pulsating character. This may give rise to interference with other apparatus, for example transmission and receiving apparatus, especially if relatively high switching frequencies are used.

It is an object of the present invention to remove the disadvantages and drawbacks of the prior art, and to provide apparatus which renders it possible for an input energy supplied to it to be converted at a relatively high switching frequency into a form desired on the load end.

According to the present invention, there is provided an electric energy conversion apparatus comprising a converter including a transformer having a core on which are wound a plurality of input windings and an output winding; a first highpower transistor configuration connected to one end of a tapped main input winding, and a second lower-power transistor configuration connected to the other end of said main input winding, the arrangement being such that when a voltage is supplied to the converter said first and second transistors are alternately switched into the conducting state, and the core is magnetized in alternating directions, there being a rectifying circuit connected to said output winding, which rectifying circuit is in the current-conducting state only if said first high-power transistor configuration is in the conducting state, characterized in that an electrode of said first transistor configuration of one or more of said converters, which electrode is active as a control electrode, is connected to a control circuit for controlling the switching actions, said control circuit being arranged so that said first transistor configuration is switched out of the conducting state each time before said core has been driven into saturation, and is switched into the conducting state each time immediately after said second transistor configuration has been switched into the non-conducting state.

The use of such a control circuit proposed according to the present invention results in the advantage that energy dissipation in the high-power transistor configuration is considerably diminished, in particular when a high conversion frequency is used. As there is only one high-power transistor configuration which must be controlled, the control circuit may be of relatively simple design, it being possible for the apparatus to be dimensioned for high conversion frequencies, and to be made extremely compact, of light weight, at a low cost-price, and with a high efficiency. In such an arrangement, unilateral magnetization of the core of the output transformers is also prevented, as the relevant low-power transistor configuration is switched off in response to saturation of the core of the relevant output transformer, as a consequence of which there is no direct voltage component in the primary winding of such a transformer.

In a different embodiment illustrative of the present invention, a control circuit of the kind as used in the above-defined basic embodiment of the present invention is used conjointly for two or more parallel-connected converters, the arrangement being such that the high-power transistor configurations concerned are switched into the conducting state and into the blocking state with a difference in phase such that at all times at least one high-power transistor configuration of one of the parallel-connected converters is in the conducting state.

The most important advantages of such an embodiment are (1) the "on" time of the power transistor configurations, i.e., the period when they are in the conductive state, can be dimensioned so that current take-off from the input current source, as well as current supply to the load are extremely uniform, in other words, nonpulsating; (2) a relatively simple control circuit enables a high conversion frequency, while nevertheless a high efficiency is ensured; and (3) unilateral magnetization of the core of the output transformers is prevented, since the respective low-power transistor configurations are switched off through saturation of the core of the respective output transformer, so that no direct-voltage component is present in the primary winding of such a transformer.

Problems often occurring in other kinds of converters as a consequence of a DC voltage or current component are described, for example, in Dutch patent application No. 69,19147.

In a third embodiment illustrative of the present invention, which embodiment is intended in particular for producing from an input current an output current having a different frequency, use is made of a frequency conversion system which is devoid of a transformer, and which as regards function resembles the known per se cycloconverter, with which a current having a relatively high frequency can be converted into a current having a desired relatively low frequency. Such cyclo converters are known per se, for example, from General Electric SCR Manual 1967, sub 11.4.3 and 11.4.3.1. Such known forms a cyclo convertery have the drawback that the conversion frequency is limited to a certain maximum value of about 10 KHz, as a consequence of the switching-off period of a thyristor used in such converters. Such a drawback is removed in the present third embodiment illustrative of the present invention owing to the fact that a converter and a transformerless frequency-conversion device connected to the output thereof are combined into one unit, in which the thyristors used in the frequency-conversion device need not be switched off within the half-cycle time of the voltage of the high-frequency converter, as, when a thyristor must be switched off. This is achieved by switching off the converter proper during the time necessary to switch off the thyristor concerned. Furthermore, the desired form of the voltage generated at the output is obtained not, as is the case according to these known per se proposals, through phase control using thyristors included in the cyclo converter, but by switching off the converter for suitable periods of time.

The invention will now be described in more detail with reference to the accompanying drawings. In said drawings, FIG. 1 is a basic diagram of a conversion apparatus according to the present invention;

Figure 1:
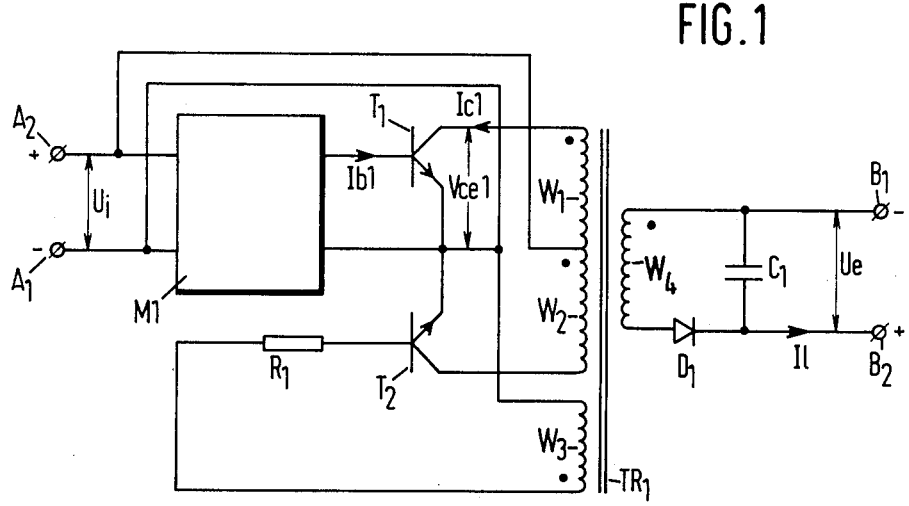

Referring to FIG. 1, there is shown a circuit connected by means of terminals A1 and A2 to a source of DC voltage. The voltage of the DC voltage source is Ui. The circuit comprises a transformer TR1 with windings W1, W2, W3 and W4. The numbers of turns of these windings are, respectively, N1, N2, N3 and N4. Furthermore, the circuit comprises a high-power transistor T1 and a low-power transistor T2, a control circuit M1, a rectifying diode D1, a capacitor C1, a resistor R1 and a pair of output terminals B1 and B2. The output voltage is Ue. The "high-power transistor" just referred to, and also used in other embodiments, may consist of one transistor or of a plurality of parallel-connected transistors.

Figure 3:
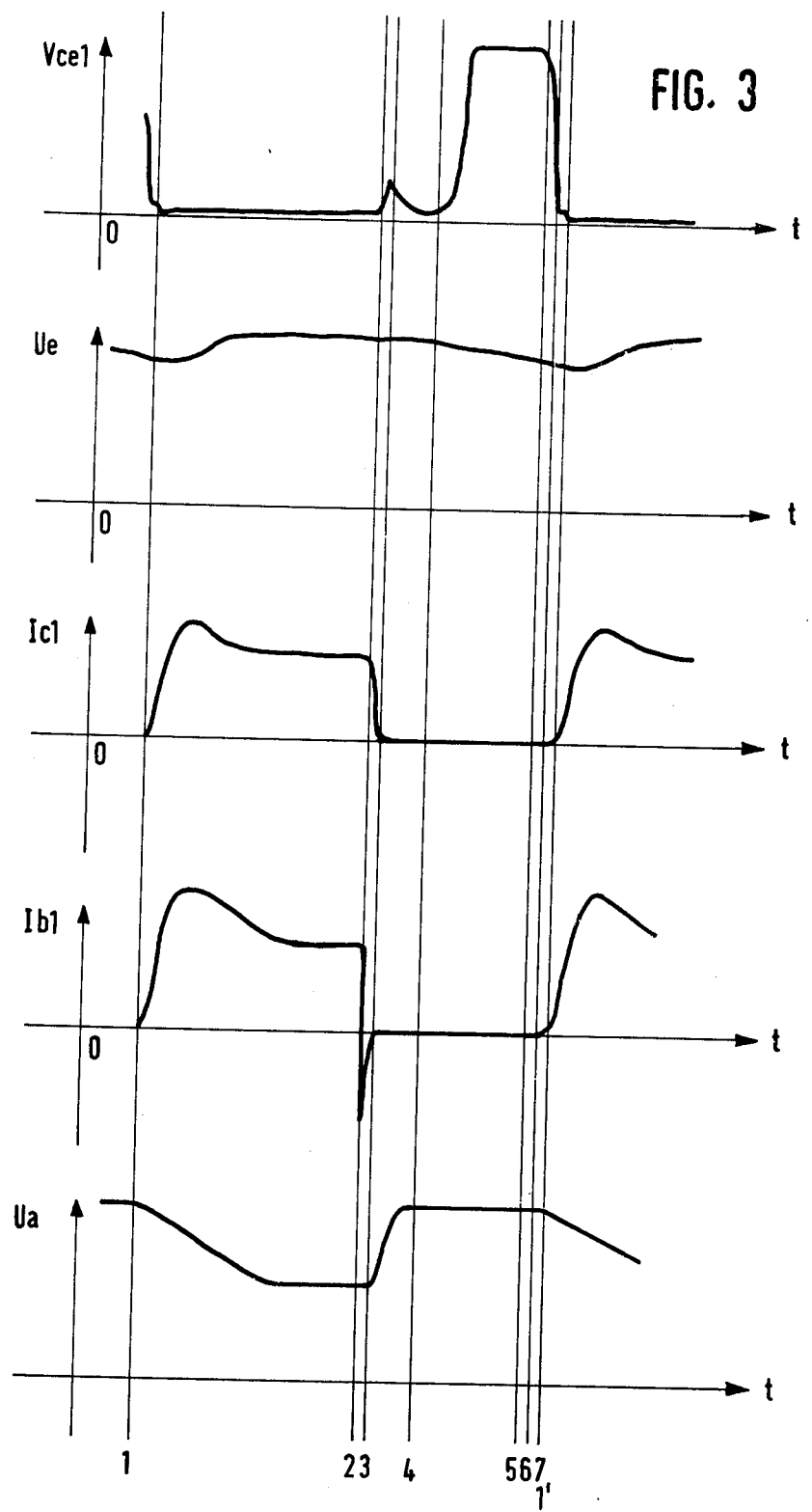
FIG. 3 shows the voltage and current curves of the arrangement shown in FIGS. 1 and 2.

The principle of operation of the converter will now be described with reference to FIGS. 1 and 3.

At moment 1 (see FIG. 3) high-power transistor T1 is rendered conductive by means of a base current $I_{b1}$ from control circuit M1.

Current will then flow through winding W1 of transformer TR1. The collector-emitter voltage $V_{ce1}$ of transistor T1 then rapidly reaches a saturation value which is low relative to the input voltage Ui, and capacitor C1 is charged via diode D1 to a DC voltage approximately equal to $U_i \cdot N4/N1$. At moment 2, the direction of the base current of transistor T1 is inverted by means of circuit M1 and shortly thereafter, at moment 3, the collector current and base current of transistor T1 cease, i.e., transistor T1 is no longer conductive. The interval between moments 1 and 2 is selected so that, at moment 3, the transformer is not yet saturated. As a result of the self-induction of the windings and the coupling between the windings, the collector-emitter voltage $V_{ce1}$ of transistor T1 will increase between moment 2 and moment 4, and thereafter decrease again. The exact behaviour of the transformer between moments 2 and 4 and the interval from moment 2 to moment 4 depend greatly on the transformer core material used, the shape of the transformer core, and the positions of the various windings on the core and relatively to each other. In order to minimize energy losses in switching off transistor T1, the voltage increase between moments 2 and 3 should be as small as possible. If necessary or desirable, in order to prevent unduly fast rise of the collector-emitter voltage of transistor T1 between moments 2 and 3, a capacitor may be interposed between the collector and the emitter of this transistor (this capacitor is not shown in FIG. 1). At moment 4, the collector-emitter voltage of T1 increases again as a consequence of the self-induction of winding W1, and the polarity of the voltage across the windings of the transformer is inverted, so that, via winding W3 and resistor R1, a base current is going to flow through transistor T2. As a result, this transistor is rendered conductive, so that the collector-emitter voltage of the transistor decreases to saturation. There is now a voltage across diode D1 in the reverse direction. After an interval proportional to the number of turns N2 of winding W2, the core material of transformer TR1 reaches saturation (moment 5), as a consequence of which the collector-emitter voltage of transistor T2 is again increased. The voltage across winding W3 decreases at the same time, so that transistor T2 is brought into the non-conductive state. As a result of the self-induction of winding W2, the polarity of the voltage across the windings of the transformer will be reversed. The voltage across the secondary winding W4 will increase until, at moment 6, it is again equal to the voltage across the capacitor (the voltage in the direction of passage across diode D1 being ignored). If a load is provided between output terminals B1 and B2, capacitor C1 will have gradually discharged from moment 2, so that at moment 6 the voltage across winding W4 will be slightly lower, and hence the collector-emitter voltage $V_{ce1}$ slightly higher, than was the case at moment 2. At moment 7, transistor T1 is again rendered conductive by means of the control circuit, and the cycle described above is repeated. In other words, moment 7 is identical to moment 1.

The configuration of the collector current of transistor T1 between moments 1 and 2 deserves particular attention. When a load is provided between output terminals B1 and B2, the voltage across capacitor C1 will have slightly decreased between moments 2 and 7. When transistor T1 is again brought into the conductive state, the collector current will increase until capacitor C1 has been charged to a voltage approximately equal to $Ui.N4/N1$. When capacitor C1 has been charged, the collector current will again decrease to a current approximately equal to $I1.N4/N1$, $I1$ representing the current through the load. Owing to the presence of capacitor C1, therefore, collector current $Ic1$ exhibits a maximum. A typical configuration of the collector current $Ic1$ is shown in FIG. 3. When base current $Ib1$ of transistor T1 should be selected to be constant between moments 1 and 2, it should be selected so high that even during the maximum of collector current $Ic1$ the collector-emitter voltage $Vce1$ of transistor T1 is hardly, if at all, increased. The result would be that the average base current $Ib1$ is very high. In particular, base current $Ib1$ will be too high at moment 2, when transistor T1 is again switched off. This will result in undesirable delay in switching. This delay may become extremely bothersome if it amounts to a considerable fraction of an oscillation cycle of the converter. For this reason the converter according to the invention comprises a control circuit in which the base current $Ib1$ also exhibits a maximum. At the moment when the collector current exhibits a maximum, the base current $Ib1$ is higher than just before moment 2.

Figure 2:
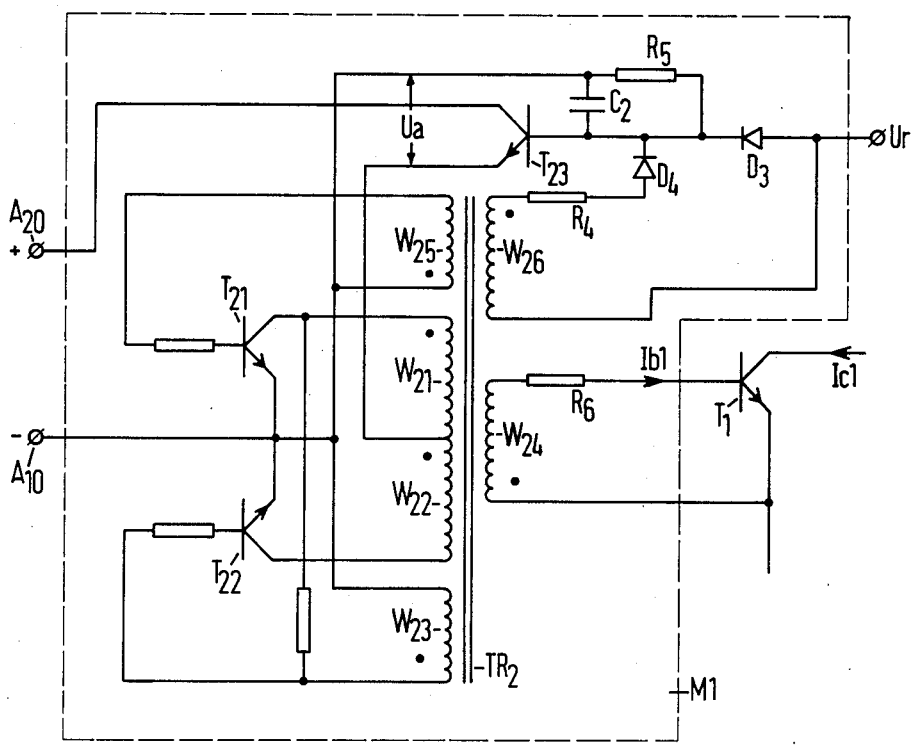
FIG. 2 illustrates a possible mode of execution of a portion of FIG. 1.

FIG. 2 shows a possible embodiment of the control circuit. The principal parts of the control circuit are transformer TR2, windings W21, W22, W23, W24, W25 and W26, transistors T21 and T22, T23, diodes D3 and D4, capacitor C2, and resistors R4, R5 and R6.

The operation of the control circuit is to a great extent analogous to that of the converter as described with reference to FIG. 1. Windings W21, W22, W23, W24 and transistors T21 and T22 respectively have a function analogous to windings W1, W2, W3, W4 and transistors T1 and T2, shown in FIG. 1. One difference is that transistor T21 is not steered by a control circuit, but by winding W25. Furthermore, the output circuit does not include a capacitor and a diode: the secondary winding W24 has its first end connected to the emitter and its second end connected through resistor R6 to the base of high-power transistor T1. The input terminals A10 and A20 of the circuit arrangement are connected to a source of DC voltage. In most cases, this source of DC voltage will also be the source of voltage to which terminals A1 and A2 are connected, as shown in FIG. 1. However, the DC current is not supplied direct to the oscillator circuit arrangement constituted by transformer TR2 and transistors T21 and T22, but flows through transistor T23. The input voltage $Ua$ of the oscillator is controlled through transistor T23 by means of the reference voltage $Ur$ and the auxiliary winding W26. The first end of winding W26 is connected to the constant reference voltage $Ur$, and the second end is connected through resistor R4 and diode D4 to the base of transistor T23.

The operation of the circuit arrangement of FIG. 2 is as follows. Suppose that transistor T22 is conductive. The output voltage of winding W24 is then such that the base voltage of transistor T1 is negative relative to the emitter voltage, so that this transistor is in the non-conductive state. At moment 1 (see FIG. 3), the core of transformer TR2 reaches saturation, as a result of which the collector-emitter voltage of transistor T22 is greatly increased. At the same time, the voltage across winding W23 is decreased, so that transistor T22 becomes non-conductive. As a consequence, the voltage across the windings of transformer TR2 receives an opposite polarity, so that transistor T21 becomes conductive. There will then also flow base current through transistor T1, which renders T1 conductive. After some time, at moment 2, the core of transformer TR2 again reaches saturation, whereby transistor T21 becomes non-conductive, and transistor T22 becomes conductive. The base current $Ib1$ through transistor T1 is then reversed and is extinguished a short time later (moment 3), so that transistor T1 is no longer conductive. After some time the core of transformer TR2 again reaches saturation, and the whole cycle is repeated.

However, in the course of a cycle, the voltage $Ua$ between the emitter of transistor T23 and terminal A10 is not constant. Just before moment 2, it is practically equal to the reference voltage $Ur$ (the voltage drop across the diode D3 and the base-emitter junction of transistor T23 are ignored). However, at moment 2 the voltage on the second upper end of winding W26 becomes higher than the voltage on the first lower end, $Ur$. As a consequence, through resistor R4 and diode D4, the base voltage of transistor T23, and hence the supply voltage $Ua$ of the oscillator will be increased (naturally, for proper operation of the circuit, the base voltage of transistor T23 should never be higher than the voltage between terminals A10 and A20). The voltage $Ua$ further remains constant until moment 7 (moment 7 is identical to moment 1): then the polarity of the voltage across winding W26 is reversed, and no current flows through this winding any longer. The voltage $Ua$ will then again decrease relatively slowly until the voltage is reached at which diode D3 becomes conductive again. The rate of decrease of the voltage depends on the R-C ratio of resistor R5 and capacitor C2 and on the base current through transistor T23. It is clear that this change in supply voltage $Ua$ results in that the base current $Ib1$ through transistor T1 between moments 1 and 2 will initially be higher than just before moment 2. The rate of increase of base current $Ib1$ just after moment 1 is mainly determined by the coupling factor between windings W24 and W21. According as the coupling between these windings is poorer, the current $Ib1$ will increase more slowly just after moment 1. The effect of a poor coupling factor is that of a self-inductance placed in the circuit constituted by winding W24, resistor R6 and the base-emitter junction of transistor T1. The difference between the maximum of current $Ib1$ and the average current $Ib1$ is mainly determined by the number of turns of winding W26.

The configuration of the base current $Ib1$ of transistor T1 can be adapted to the configuration of collector current $Ic1$ of this transistor by a suitable selection of the coupling factor between the windings W21 and W24, and of resistor R5, capacitor C2 and the number of turns of winding W26. Furthermore, by means of suitable selection of the frequency of the oscillator and the ratio of the number of turns of windings W21 and W22, the ratio of the interval between moments 1 and 2 and the interval between moments 2 and 7 can be selected such that transistor T2 of FIG. 1 is just no longer conductive (moment 6) when transistor T1 is again supplied with base current (moment 7).

In summary, control circuit M1 has the following functions: it determines the frequency of the converter, ensures that transistor T1 does not become conductive until transistor T2 is no longer conductive, that transistor T1 is rendered non-conductive before the core of transformer TR1 becomes saturated, and that the base current of transistor T1 is adapted to the collector current of this transistor.

It will be clear that the control circuit can easily be modified in various manners, while retaining the functions described. One modification, for example, would be for the feedback windings W23 and W25 of transformer TR2 to be removed and for transistors T21 and T22 to be steered by means of a separate oscillator.

Figure 4:
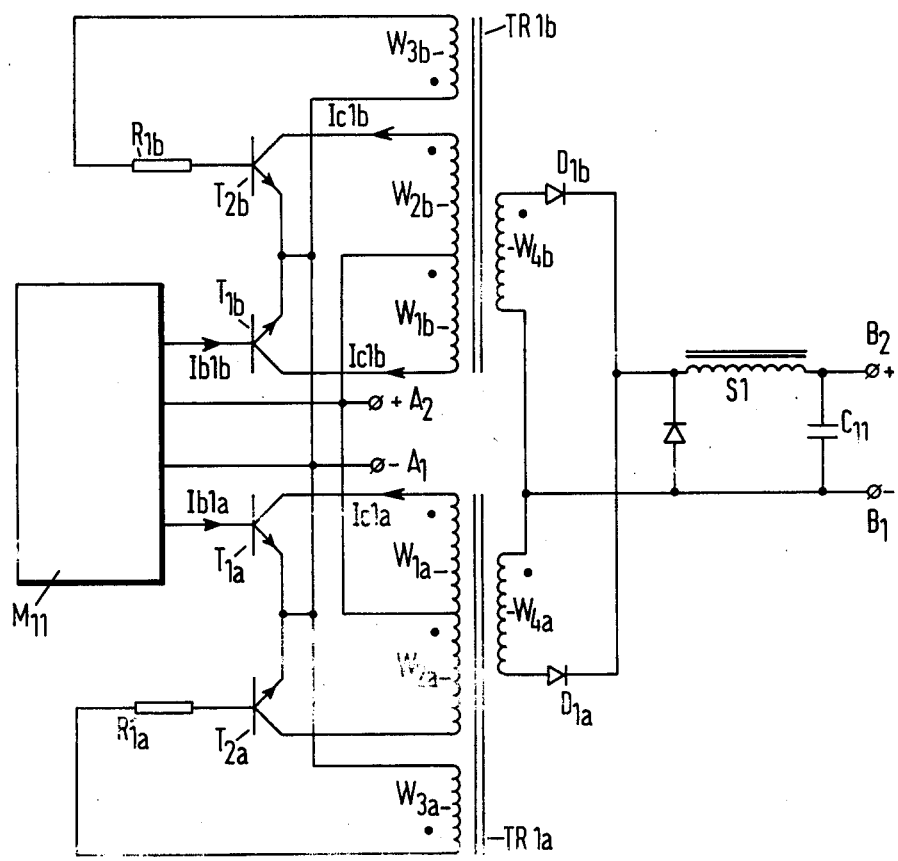
FIG. 4 is a basic diagram of an arrangement with two parallel-connected converters according to the present invention.

FIG. 4 shows a basic diagram of an embodiment in which two converters as described with reference to FIG. 1 are parallel-connected, the oscillations of the two converters exhibiting a constant difference in phase of 180°. The functions of elements TR1a, W1a, W2a, W3a, W4a, T1a, T2a, D1a and R1a are respectively equivalent to the functions of elements TR1b, W1b, W2b, W3b, W4b, T1b, T2b, D1b and R1b, and to functions of elements TR1, W1, W2, W3, W4, T1, T2, D1 and R1, shown in FIG. 1. Furthermore, the circuit arrangement of FIG. 4 comprises a control circuit M11 and an output filter constituted by self-inductance S1 and capacitor C11.

Figure 5:
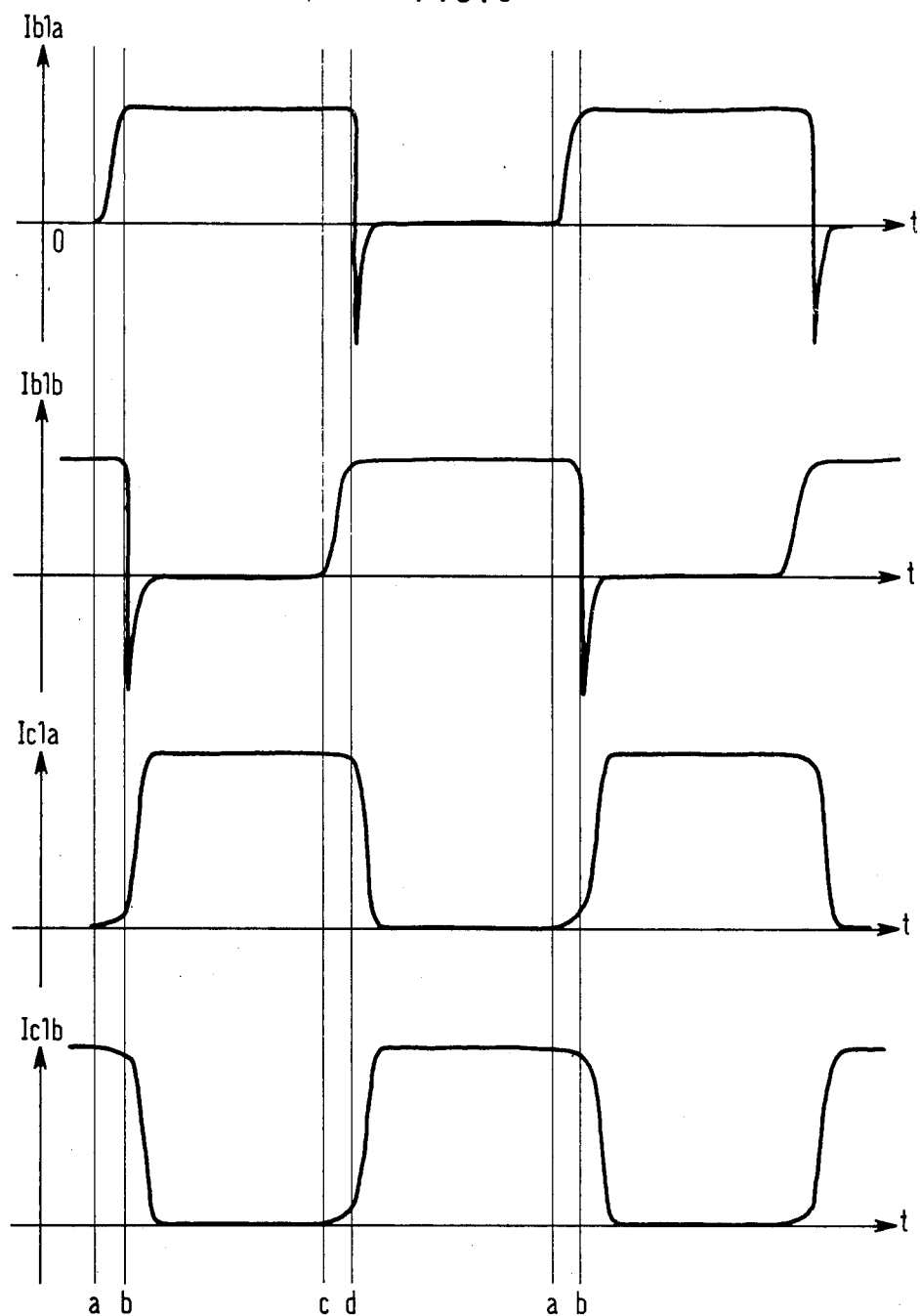
FIG. 5 shows current curves of the arrangement shown in FIG. 4.

The operation of the circuit arrangement will be clarified with reference to the wave configurations shown in FIG. 5. For a good operation of the arrangement of FIG. 4, there must always be at least one of transistors T1a and T1b which is in the conductive state. For that purpose, base current must flow at all times to at least one of transistors T1a and T1b, too. FIG. 5 shows the wave forms of the collector and base currents of transistors T1a and T1b for the case that a base current flows to both transistors during a short interval between moments (a, b) and between moments (c, d).

The effect of self-inductance S1 is that, with a constant load, the sum of currents through diodes D1a and D1b will always be constant. As a consequence, the sum of collector currents Ic1a + Ic1b through transistors T1a and T1b will be approximately constant as well. The result is that the collector current of these transistors individually no longer exhibits a maximum, but on the contrary is highly constant during the time when the respective transistors are in the conductive state. Consequently, the base current of transistors T1a and T1b need not exhibit a maximum either.

Figure 6:
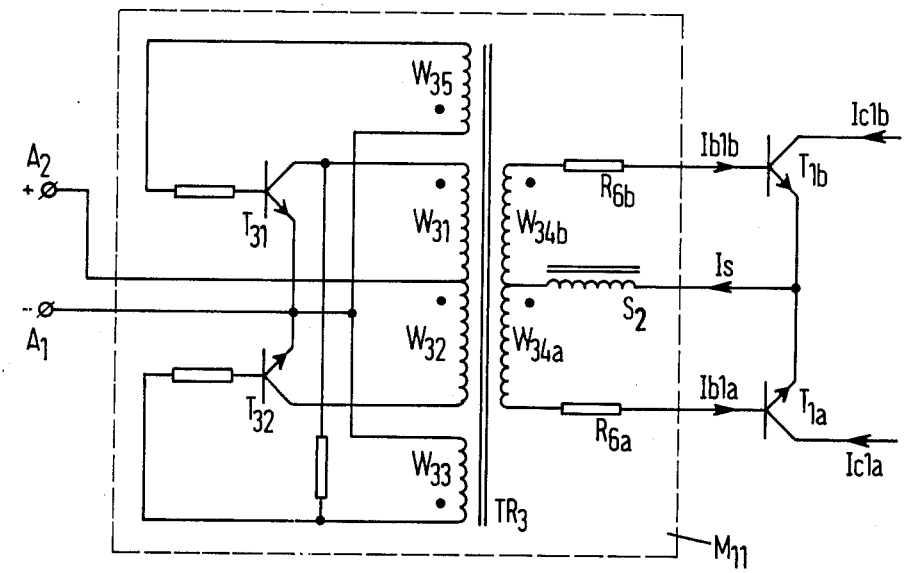
FIG. 6 illustrates a possible mode of execution of a portion of FIG. 4.

FIG. 6 shows a basic diagram of a preferred embodiment of control circuit M11. The functions of elements W31, W32, W33, W35, T31 and T32 of FIG. 6 are respectively analogous to the functions of elements W21, W22, W23, W25, T21 and T22 of FIG. 2. The number of turns of winding W31, however, will now, generally speaking, be selected to be equal to the number of turns of winding W32. The base current of transistors T1a and T1b flows through self-inductance S2, windings W34a, W34b, and resistors R6a, R6b. Current Is in FIG. 6 will be practically constant as a result of self-inductance S2. As a consequence, the sum of the base currents. Ib1a + Ib1b, will be practically constant as well. The effect is that when one of transistors T1b or T1a is switched off, the resulting base current of the transistor concerned will be reversed in direction for a short time, and will be added to the base current which just begins to flow in transistor T1b and T1a which is switched on. As a result, transistors T1b, T1a will be switched out of the conductive state with some delay, and will be switched into the conductive state with some acceleration, so that, during the switching process, the sum of the collector currents, Ic1a + Ic1b, will be relatively constant. In some cases the self-inductance S2 may be replaced by a resistor. The wave forms for the arrangement of FIG. 6 are not shown.

In summary, control circuit M11 performs the following functions:

switching off transistors T1a, T1b before transformer cores TR1a, TR1b, respectively, become saturated; switching on these transistors after transistors T2a, T2b, respectively, have been rendered nonconductive. In addition, control circuit M11 switches transistors T1a and T1b in such a manner that the sum of the collector currents of the transistors is relatively constant during the switching process.

It will be clear that, in addition to the parallel-connection of two converters according to the present invention with a common or coupled control circuit, as described above, a parallel connection of more than two converters can be realized. For example, when three converters are parallel connected, a choice can be made between a situation in which at all times the high-power transistor of at least one of the converters is conductive (in that case the high-power transistors must be conductive for at least 33.33% of the time), and a situation in which at all times the high-power transistors of at least two of the converters are conductive (in which case the high-power transistors must be conductive for at least 66.66% of the time).

Figure 7:
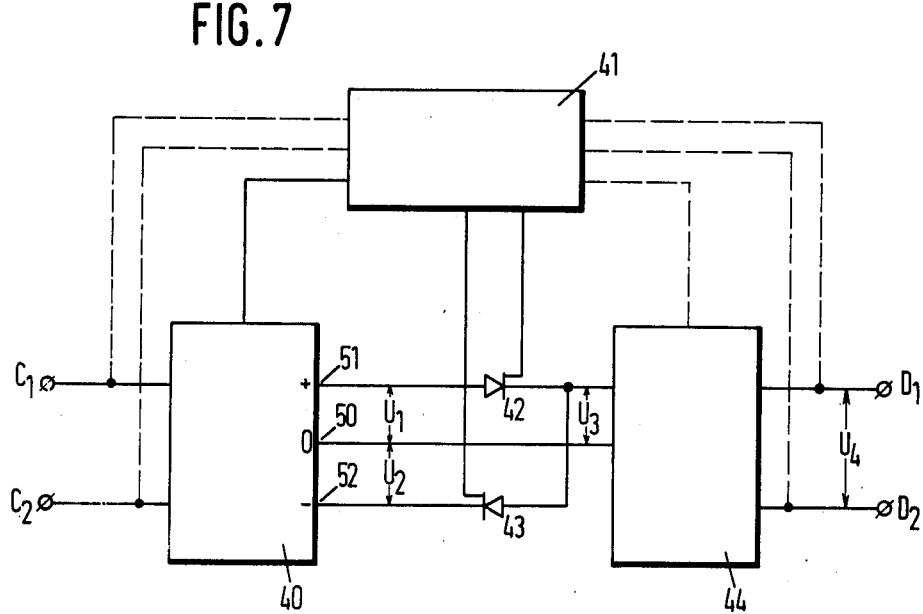
FIG. 7 is a basic diagram illustrating the method that can be used to produce an AC output voltage.

FIG. 7 shows a block diagram of a composite apparatus for converting energy to illustrate a further aspect of the present invention. According to this further aspect, a converter arranged for energy conversion at relatively high conversion frequencies (in the order of 20 KHz), and in particular a converter designed as described hereinbefore with reference to FIGS. 1 and 2, can advantageously be used in combination with a transformerless frequency-transforming device of a design specially adapted to the high conversion frequency of said converter to produce a relatively low-frequency AC output voltage.

The circuit arrangement of FIG. 7 comprises two input terminals C1 and C2, a converter 40, a control circuit 41, two semiconductor switching means, such as for example, thyristors 42 and 43, an output filter 44 and two output terminals D1 and D2, between which a load can be connected.

As the operation of such semiconductor switching means as thyristors is greatly analogous to that of a locking switch or a self-holding relay, the states in which such switching means may be will hereinafter be designated by the terms "on" state and "off" state. By "on" state is understood a situation in which the thyristor or thyristors may be currentless without requiring a trigger pulse to be supplied to the gate electrode for their being switched into the conductive state. By "off" state is understood a situation in which when the thyristor or thyristors are currentless a trigger pulse must be supplied to the gate electrode to bring the thyristor or thyristors into the conductive state.

In connection with the purpose described hereinbefore, converter 40 converts a voltage applied to input terminals C1 and C2 into a relatively high-frequency AC voltage, which, if desired or necessary, is rectified. The converter is arranged so that voltage U1 on line 51

(see FIG. 7) is positive relative to the voltage on line 50 during certain moments, and voltage U2 on line 52 is negative relative to the voltage on line 50 during certain moments. Generally speaking, therefore, in order to prevent short-circuiting, no more than one of thyristors 42, 43 may be in the "on" state.

Control circuit 41 is in connection with converter 40, thyristors 42 and 43, and possibly with certain elements in the output filter 44, with output terminals D1, D2, or with input terminals C1, C2, or with a reference voltage. The principal functions of control circuit 41 are: bringing a respective one of thyristors 42 and 43 into said "on" state at suitable moments, and influencing voltages U1 and U2, this on the ground of certain internally generated signals or on the ground of certain external signals, such as, for example, the voltage across the output terminals, the voltage across the input terminals or/and a reference voltage, all this as diagrammetically shown in dotted lines in FIG. 7.

Suppose that thyristor 422 is "on". As a result, the polarity of voltage U3 at the input of filter 44 will predominantly be positive. Characteristic of the arrangement of FIG. 7 is that the form of voltage U3, and hence of the filtered voltage U4 across output terminals D1 and D2, while thyristor 42 is "on", is controlled by influencing voltage U1 of converter 40 by means of control circuit 41, for example, by switching off converter 40 for suitable periods of time. When thyristor 43 is "on", the output voltage U4 is controlled by influencing voltage U2 of the converter. When thyristor 42 is "on", the polarity of the output voltage U4 will generally be inverse to the polarity of output voltage U4 when thyristor 43 is "on". When one of the thyristors is "on", it can be brought into the "off" state by influencing the output voltage U1, U2 of the converter in such a manner that no current flows through the thyristor concerned any longer for a time at least as long as the switching off time of the thyristor. Thereafter the thyristor in the "off" state can be switched to the "on" state. In this manner, i.e. by controlling both the converter and the thyristors, a certain desired AC voltage can be obtained across output terminals D1 and D2.

The characteristics of output filter 44 will depend mainly on the characteristics of the converter 40 used and the requirements concerning the output voltage U4.

The principle of the arrangement of FIG. 7 will now be elaborated for the case that the converter used therein has an arrangement as described hereinbefore with reference to FIG. 1, and also includes a control circuit as described hereinbefore with reference to FIG. 2, 4 and 6. The arrangements of FIGS. 1, 2, 4 and 6 are particularly suitable for use in the configuration of FIG. 7, because a relatively high conversion frequency can be used in these arrangements, while in addition the switching on and off of these arrangements can be effected fast and in a simple manner without undue additional costs and provisions being necessary.

When the arrangements of FIGS. 1 and 2 are used for converter 40, the secondary winding W4 of FIG. 1 is replaced by a winding W40 (not shown), the first and second ends of which are respectively connected to lines 51 and 52 of FIG. 7. Line 50 is connected to a central tap of winding W40. Winding W40 is mounted on transformer TR1 so that, when transistor T1 is conductive, the voltage on the first end is positive relative to the voltage on the second end. Input terminals C1 and C2 of FIG. 7 are now identical to input terminals A1 and A2 of FIG. 1.

If, for example, a square-wave output voltage U4 is desired, control circuit 41 may be provided with a square-wave oscillator having an output voltage of the desired frequency, means for switching thyristors 42 and 43, respectively, during the first half and the second half of the cycle of the square-wave oscillator into the "on" state, and means for switching the thyristors to the "off" state by switching off converter 40 for a time at least as long as the switching off time of thyristors 42 and 43. Now that converter 40 consists of the circuit arrangements of FIG. 1 and FIG. 2, the converter can simply be switched off by adjusting reference voltage Ur (see FIG. 2) to zero relative to input terminal A1. As a consequence, the oscillator of control circuit M1 will no longer be supplied with supply voltage, so that transistor T1 is no longer receiving base current, and hence the entire converter is switched off. The converter can be switched on again by readjusting reference voltage Ur to its old value.

Figure 8:
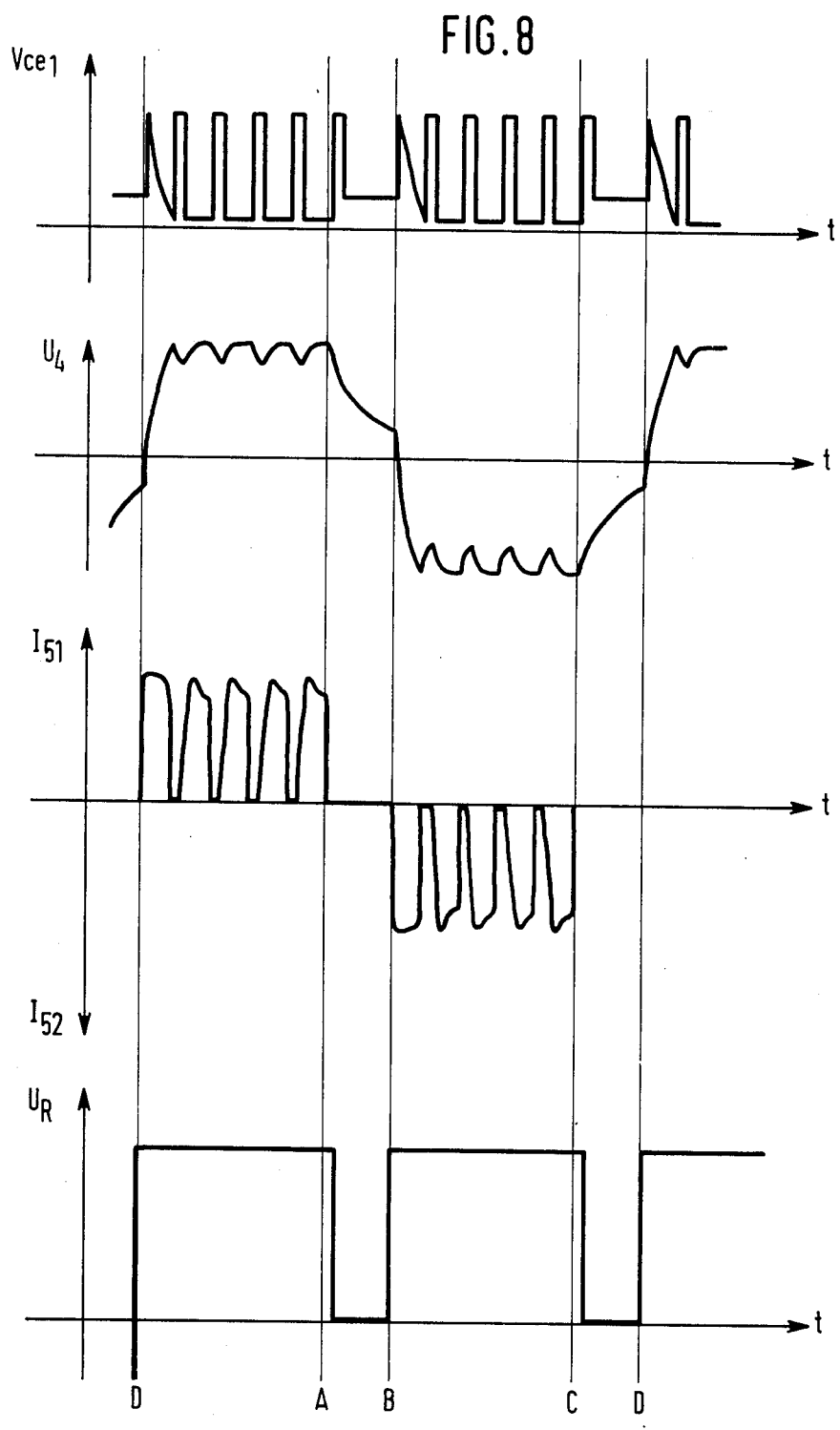
FIG. 8 shows voltage and current curves in illustration of the use of the apparatus according to the present invention in the circuit arrangement of FIG. 7.

FIG. 8 shows wave forms for this case, in which the output frequency is 1/12th of the oscillator frequency of converter 40, and output filter 44 simply consists of a capacitor in parallel with the load. The time between moments A, B and moments C, D indicated in FIG. 8 should be at least equal to the switching off time of thyristors 42 and 43. When the oscillation frequency of the converter is relatively high, it is often recommendable to include fast diodes (i.e. diodes with a short blocking time) in series with thyristors 42 and 43. In fact, the blocking time of thyristors is often rather long (in the order of a few microseconds) when after a current in the forward direction a sudden voltage in the reverse direction is applied.

Figure 9:
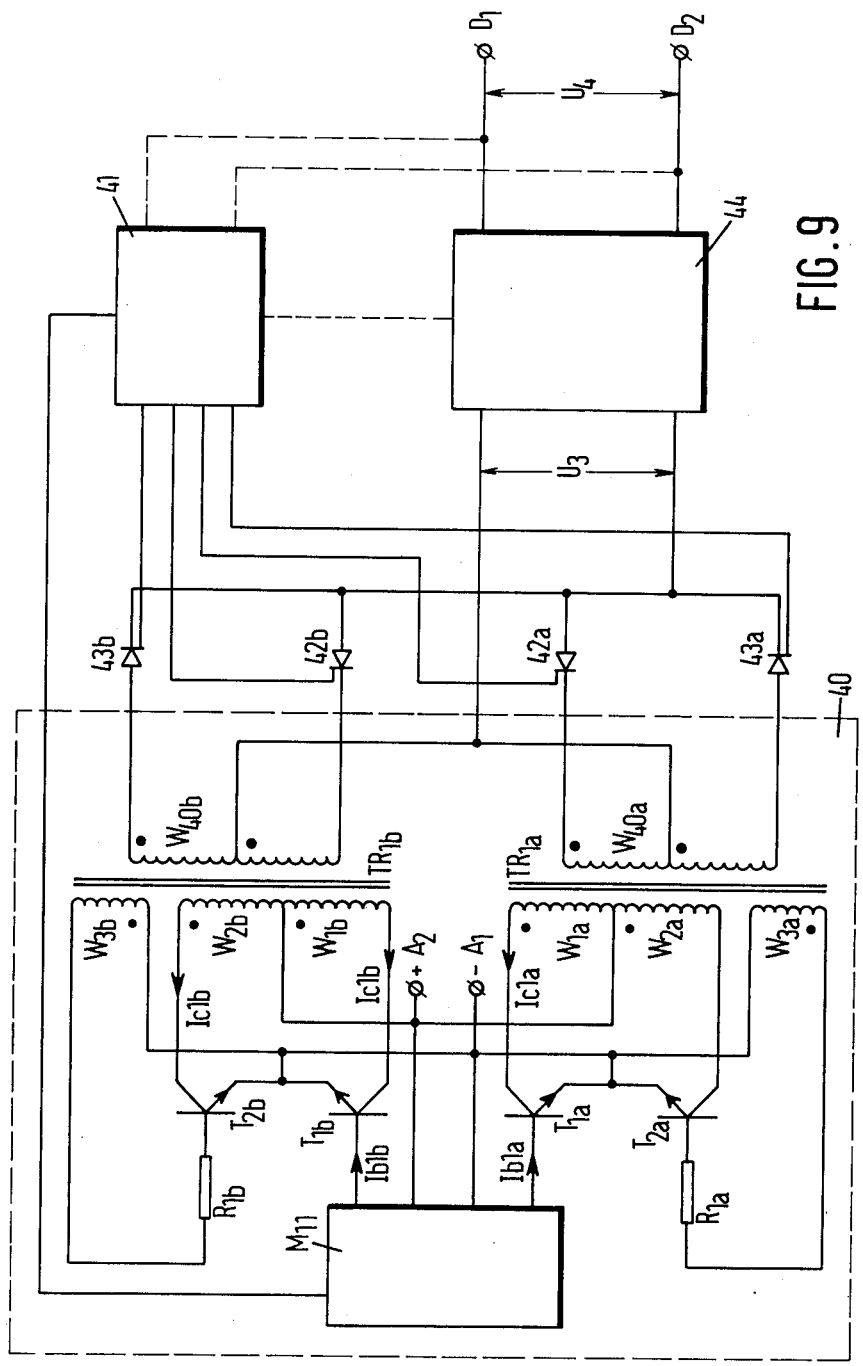
FIG. 9 shows a basic diagram, illustrating the use of two parallel-connected converters according to the present invention in the circuit arrangement of FIG. 7.
Figure 10:
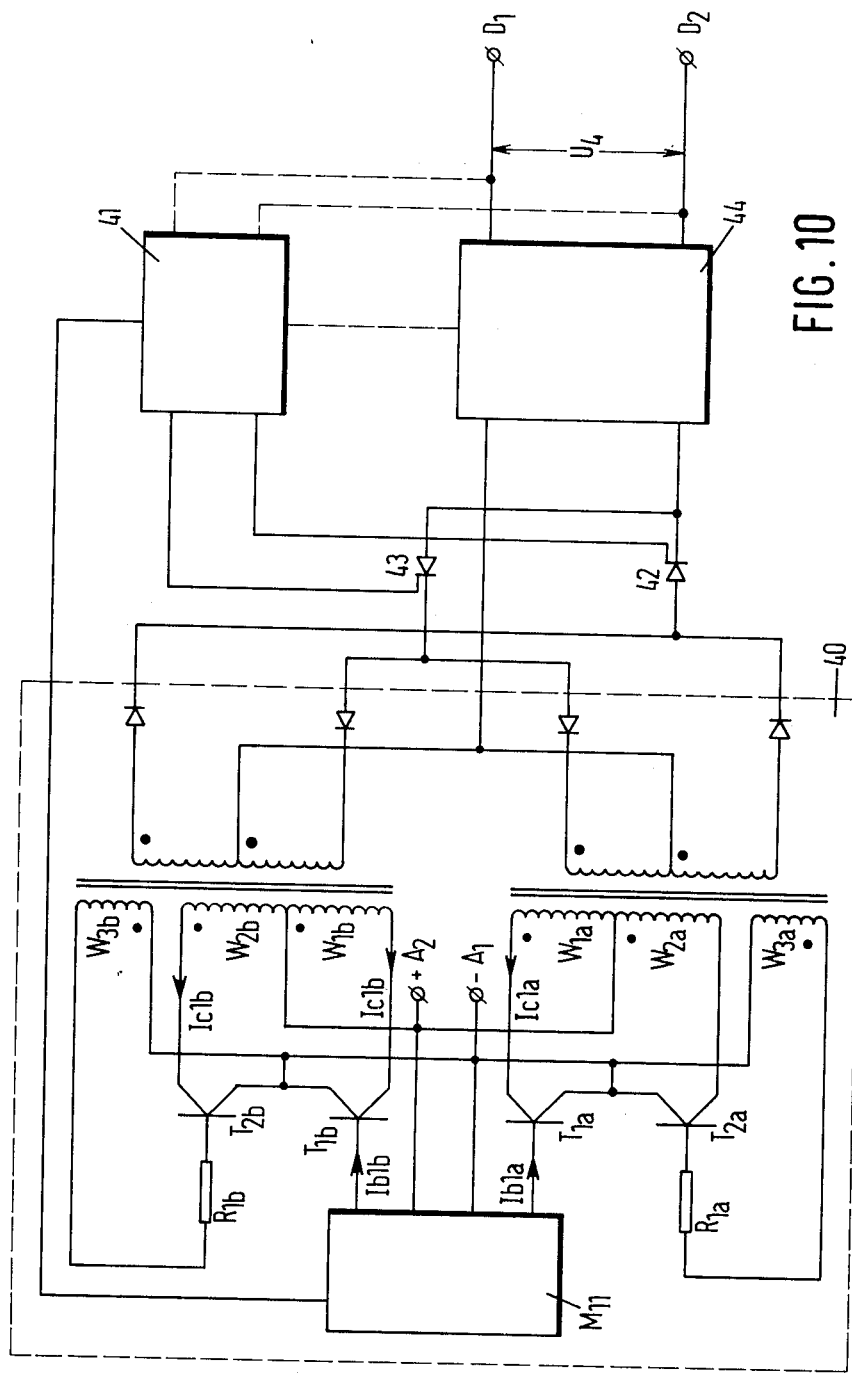
FIG. 10 shows a variant embodiment of that shown in FIG. 9.

FIGS. 9 and 10 show two possible forms of circuitry for the case that the above-described method for producing AC voltage is applied to two parallel-connected converters according to the present invention.

In the circuit of FIG. 9, four thyristors 42a, 43a, 42b and 43b are used. The circuit of FIG. 9 consists of two parallel-connected converters and thyristor circuits with a common output filter 44 and control circuit 41. In the circuit of FIG. 10 two thyristors are used only.

The principle of operation of circuits 9 and 10 is analogous to the generic case shown in FIG. 7. Thus the converter should be provided with means by which, with the aid of the control circuit, the thyristors can be switched to the "off" state. This can be achieved, for example, by controlling the supply voltage of the control circuit by means of the thyristor control circuit in such a manner that the converter can be switched on and off, in the same way as in the circuit arrangement of FIG. 7, employing a single converter according to the present invention.

I claim:
1. An electrical energy conversion apparatus comprising:
  at least one converter comprising:
    a transformer having a saturable core on which are wound a plurality of input windings including a tapped main input winding, and an output winding;
    a high-power first transistor configuration connected to one end of said tapped main input winding of said transformer, said first transistor configuration having a control electrode; and
    a low-power second transistor configuration connected to the other end of said main input winding and having a control electrode;

a rectifying circuit connected to said output winding, said rectifying circuit being in the current-conducting state only when said first transistor configuration is in the conducting state; and a circuit connected to said control electrodes of said first and second transistor configurations for controlling the switching actions thereof;

whereby when a voltage is supplied to said energy conversion apparatus, said first and second transistors are alternately switched into the conducting state and said transformer core is magnetized in alternating directions, said control circuit being operative to switch said first transistor configuration out of the conducting state before said transformer core is driven into saturation during each cycle, said first transistor configuration being switched into the conducting state when said second transistor configuration is switched into the non-conducting state, said second transistor configuration being switched into its non-conducting state when said transformer core reaches saturation while said second transistor configuration is in the conducting state.

2. Apparatus according to claim 1, wherein said control circuit comprises means for effecting that, each time during a control pulse when said first transistor configuration is conductive, the pulsating control current supplied to the control electrode of said first transistor configuration of a single converter has a maximum timed and dimensioned so that a switching current surge from said first transistor configuration is taken up.

3. Apparatus according to claim 2, wherein said control circuit comprises an oscillator comprising means for deriving from a supplied DC voltage a supply voltage (Ua) for said oscillator, which supply voltage varies in the rhythm of the oscillation frequency, with the understanding that each time when said first transistor configuration is conductive, said supply voltage decreases from a maximum value at the beginning of the respective conductive period to a substantially constant value maintained throughout the remaining portion of said conductive period.

4. Apparatus according to claim 3, wherein said oscillator comprises a transformer (TR2) having a core with a tapped input winding (W21, W22), an output winding (W24) and an auxiliary winding (W26) provided thereon; a first transistor (T21), the collector electrode of which is connected to one end of said input winding; and a second transistor (T22), the collector electrode of which is connected to the other end of said input winding, the arrangement being such that said first and second transistors are alternately switched into the conductive state, and the core of said transformer is magnetized in alternating directions; and said DC voltage is supplied through a third transistor (T23) to the tap of said input winding, which third transistor (T23) is operative to control said supply voltage (Ua) in dependence upon a rectified voltage generated across said auxiliary winding (W26) and a DC voltage (Ur) acting as a reference.

5. Apparatus according to claim 4, wherein the control of said third transistor (T23) is determined by an RC circuit (R5, C2) included in the base circuit of said transistor, the arrangement being such that the rate at which said supply voltage (Ua) decreases is determined by the time constant of said RC circuit.

6. Apparatus according to claim 4 wherein the coupling factor between said input winding (W21) and said output winding (W24) is dimensioned in proportion to the desired rise time of the recurrently generated control current pulse when said first transistor configuration (T1) is conductive.

7. Apparatus according to claim 4 wherein the ratio between the number of turns of the input winding portion (W21) between said one end and said tap of said input winding and the input winding portion (W22) between said tap and said other end of said input winding, and also the oscillator frequency are dimensioned so that the current in the output winding (W24) each time begins just after said second transistor configuration (T2) has been switched into the blocking state, and each time ends just before the core of the transformer (TR1) is driven into saturation.

8. Apparatus according to claim 1 wherein said electrical energy conversion apparatus comprises a plurality of converters, and wherein said control circuit has a plurality of separate output terminals each connected to an associated one of an equal plurality of converters having their respective output windings connected in parallel.

9. Apparatus according to claim 8, wherein the control circuit has two separate output terminals each connected to an associated converter, said control circuit being arranged so that the control pulse recurrently supplied to the associated converter when the respective high-power transistor configuration (T1a, T1b) is conductive has a substantially constant maximum value virtually throughout the conductive period of said transistor configuration, and the parallel-connected output windings (W4a, W4b) are connected to an output circuit arranged so that the sum of the collector currents of the respective two high-power transistor configurations (T1a, T1b) is substantially constant during the switching process in which these two transistors change in state in opposite directions.

10. Apparatus according to claim 9, wherein said control circuit has a transformer (TR3) having a core with a tapped input winding (W31, W32) and a tapped output winding (W34a, W34b) wound thereon, a first transistor (T31) the collector electrode of which is connected to one end of said input winding, and a second transistor (T32), the collector electrode of which is connected to the other end of said input winding, the arrangement being such that when a voltage is applied to said tap of said input winding, said first and second transistors are alternately switched into the conductive state, and the core of said transformer (TR3) is magnetized in alternating directions; and said tap of said output winding being included in a circuit arranged so that the sum of the output currents at said one and said other end of said output winding is substantially constant.

11. Apparatus according to claim 10, wherein said circuit in which the tap of said output winding (W34a, W34b) is included comprises an inductance coil (S2).

12. Apparatus according to claim 1, wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

13. Apparatus according to claim 12, characterized in that said transformerless frequency-transforming device comprises a control circuit (41) operative to influence a voltage (U1, U2) generated at the output of the converter each time when one or more of the semiconductor switching means is in the "on" state, thereby to control the wave form of a voltage (U3) as generated at the output end of a circuit including said semiconductor switching means and thereby the output voltage (U4) as generated across a load.

14. Apparatus according to claim 13, wherein said control circuit (41) is common to two converters coupled together through their respective output windings, said control circuit being operative to control four semiconductor switching means (42a, 42b, 43a, 43b) included in the output circuits of said converters, and a control circuit (M11) common to these two converters.

15. Apparatus according to claim 13, wherein said control circuit (41) is common to two converters coupled together through their respective output windings, said control circuit being operative to control two semiconductor switching means (42, 43) connected to said output windings, and a control circuit (m11) common to these two converters.

16. A composite apparatus for converting electric energy, characterized by a first converter arranged for energy conversion at a relatively high conversion frequency, and a transformerless frequency-transforming device coupled to the output of said first converter, said transformerless frequency-transforming device including means for periodically switching said first converter on and off, so that the time interval in which said control circuit is each time switched off is at least equal to the time required to switch one or more semiconductor switching means forming part of said frequency-transforming device from an "on" state to an "off" state.

17. A composite apparatus according to claim 16, wherein said frequency-transforming device comprises a plurality of semiconductor switching means (42, 43) and a control circuit (41) operative to influence a voltage (U1, U2) generated at the output of said first converter each time when one or more of said semiconductor switching means is in the "on" state, thereby to control the form of a voltage (U3) as generated at the output end of a circuit including said semiconductor switching means, and thereby the output voltage (U4) as generated across a load.

18. A composite apparatus according to claim 17, wherein said control circuit (41) comprises a square wave oscillator and means for switching said semiconductor switching means (42, 43) to the "on" state each time during the first or second half of the cycle of the block wave produced by said square wave oscillator, and means for switching the respective semiconductor switching means to the "off" state through said first converter.

19. Apparatus according to claim 5 wherein the coupling factor between said input winding (W21) and said output winding (W24) is dimensioned in proportion to the desired rise time of the recurrently generated control current pulse when said first transistor configuration (T1) is conductive.

20. Apparatus according to claim 5 wherein the ratio between the number of turns of the input winding portion (W21) between said one end and said tap of said input winding and the input winding portion (W22) between said tap and said other end of said input winding, and also the oscillator frequency are dimensioned so that the current in the output winding (W24) each time begins just after said second transistor configuration (T2) has been switched into the blocking state, and each time ends just before the core of the transformer (TR1) is driven into saturation.

21. Apparatus according to claim 6 wherein the ratio between the number of turns of the input winding portion (W21) between said one end and said tap of said input winding and the input winding portion (W22) between said tap and said other end of said input winding, and also the oscillator frequency are dimensioned so that the current in the output winding (W24) each time begins just after said second transistor configuration (T2) has been switched into the blocking state, and each time ends before the core of the transformer (TR1) is driven into saturation.

22. Apparatus according to claim 19 wherein the ratio between the number of turns of the input winding portion (W21) between said one end and said tap of said input winding and the input winding portion (W22) between said tap and said other end of said input winding, and also the oscillator frequency are dimensioned so that the current in the output winding (W24) each time begins just after said second transistor configuration (T2) has been switched into the blocking state, and each time ends just before the core of the transformer (TR1) is driven into saturation.

23. Apparatus according to claim 2 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

24. Apparatus according to claim 3 wherein the rectifying circuit connected to said output winding is a transformless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

25. Apparatus according to claim 4 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

26. Apparatus according to claim 5 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

27. Apparatus according to claim 6 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

28. Apparatus according to claim 19 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

29. Apparatus according to claim 7 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

30. Apparatus according to claim 20 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

31. Apparatus according to claim 21 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

32. Apparatus according to claim 21 wherein the rectifying circuit connected to said output winding is a transformerless frequency-transforming device including means for periodically switching said control circuit of said converter on and off, so that the time interval in which said control circuit is each time switched off is at least equal to the time required to switch one or more semiconductor switching means forming part of said frequency-transforming device from an "on" state to an "off" state.

33. Apparatus according to claim 23 characterized in that said transformerless frequency-transforming device comprises a control circuit (41) operative to influence a voltage (U1, U2) generated at the output of the converter each time when one or more of the semiconductor switching means is in the "on" state, thereby to control the wave form of a voltage (U3) as generated at the output end of a circuit including said semiconductor switching means and thereby the output voltage (U4) as generated across a load.

34. Apparatus according to claim 13 wherein said control circuit comprises an oscillator comprising means for deriving from a supplied DC voltage as supply voltage (Ua) for said oscillator, which supply voltage varies in the rhythm of the oscillation frequency, with the understanding that each time when said first transistor configuration is conductive, said supply voltage decreases from a maximum value at the beginning of the respective conductive period to a substantially constant value maintained throughout the remaining portion of said conductive period.

35. Apparatus according to claim 34 wherein said oscillator comprises a transformer (TR2) having a core with a tapped input winding (W21, W22), an output winding (W24) and an auxiliary winding (W26) provided thereon; a first transistor (T21) the collector electrode of which is connected to one end of said input winding; and a second transistor (T22) the collector electrode of which is connected to the other end of said input winding, the arrangement being such that said first and second transistors are alternately switched into the conductive state, and the core of said transformer is magnetized in alternating directions; and said DC voltage is supplied through a third transistor (T23) to the tap of said input winding, which third transistor (T23) is operative to control said supply voltage (Ua) in dependence upon a rectified voltage generated across said auxiliary winding (W26) and a DC voltage (Ur) acting as a reference.

36. Apparatus according to claim 33 wherein said control circuit (41) is common to two converters coupled together through their respective output windings, said control circuit being operative to control four semiconductor switching means (42a, 42b, 43a, 43b) included in the output circuits of said converters, and a control circuit (M11) common to those two converters.

37. Apparatus according to claim 34 wherein said control circuit (41) is common to two converters coupled together through their respective output windings, said control circuit being operative to control four semiconductor switching means (42a, 42b, 43a, 43b) included in the output circuits of said converters, and a control circuit (M11) common to these two converters.

38. Apparatus according to claim 35 wherein said control circuit (41) is common to two converters coupled together through their respective output windings, said control circuit being operative to control four semiconductor switching means (42a, 42b, 43a, 43b) included in the output circuits of said converters, and a control circuit (M11) common to these two converters.

39. Apparatus according to claim 33 wherein said control circuit (41) is common to two converters coupled together through their respective output windings, said control circuit being operative to control two semiconductor switching means (42, 43) connected to said output windings, and a control circuit (M11) common to these two converters.

40. Apparatus according to claim 34 wherein said control circuit (41) is common to two converters coupled together through their respective output windings, said control circuit being operative to control two semiconductor switching means (42, 43) connected to said output windings, and a control circuit (M11) common to these two converters.

41. Apparatus according to claim 35 wherein said control circuit (41) is common to two converters coupled together through their respective output windings, said control circuit being operative to control two semiconductor switching means (42, 43) connected to said output windings, and a control circuit (M11) common to these two converters.

* * * * *

UNITED STATES PATENT AND TRADEMARK OFFICE
CERTIFICATE OF CORRECTION

PATENT NO. : 4,061,957
DATED : December 6, 1977
INVENTOR(S) : Reinout Jan Vader

It is certified that error appears in the above-identified patent and that said Letters Patent are hereby corrected as shown below:

On title page add:   --Foreign Application Priority Data
February 4, 1975    Netherlands    7,501,310--
In the Abstract, line 19, "convesion" should read --conversion--.
Column 3, line 9, "a cyclo convertery" should read --of cyclo-converters--.
Column 9, line 20, "422" should be --42--.
Column 15, line 48, change "21" to --22--.

Signed and Sealed this

Fourth Day of July 1978

[SEAL]

Attest:

RUTH C. MASON
Attesting Officer

DONALD W. BANNER
Commissioner of Patents and Trademarks